United States Patent Office 3,423,436
Patented Jan. 21, 1969

3,423,436
1-CYANO-ANDROSTANES
Albert Bowers, Mexico City, Mexico, assignor to Syntex Corporation, Panama, Panama, a corporation of Panama
No Drawing. Filed Sept. 16, 1963, Ser. No. 309,302
U.S. Cl. 260—397.45
Int. Cl. C07c *169/22, 167/00*
7 Claims

ABSTRACT OF THE DISCLOSURE 1-cyano androstanes having a 17β-hydroxy or 17β-acyloxy group, oxygenated or not at C–11, which have a favorable anabolic-androgenic ratio and which exhibit anti-estrogenic, anti-gonadotrophic, anti-fibrillatory activity and appetite stimulating properties.

---

The present invention relates to novel cyclopentanophenanthrene derivatives and to a process for the production thereof.

More particularly, this invention relates to novel 1-cyano androstane derivatives.

The novel compounds of the present invention are represented by the following formula:

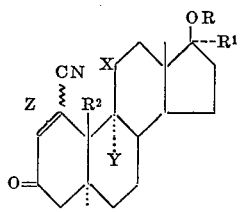

In the above formula R represents hydrogen or a hydrocarbon carboxylic acyl group of less than 12 carbon atoms; R¹ represents hydrogen, lower alkyl, lower alkenyl or lower alkinyl; R² represents hydrogen or methyl; X represents hydrogen, β-hydroxyl or a keto group; Y represents hydrogen, chlorine or fluorine and when X is hydrogen, Y is also hydrogen; Z represents a double bond or a saturated linkage, each between C–1 and C–2; and ⁞ indicates that the 1-cyano group may be at the α or at the β-position when Z is a saturated linkage.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention represented by the above formula are anabolic-androgenic agents with a favorable anabolic-androgenic ratio. In addition, they have anti-estogenic, anti-gonadotrophic, anti-fibrillatory and appetite stimulating properties. Furthermore, they lower the blood cholesterol level, relieve premenstrual tension and suppress the output of the pituitary gland.

The novel compounds of this invention are prepared by the process exemplified as follows:

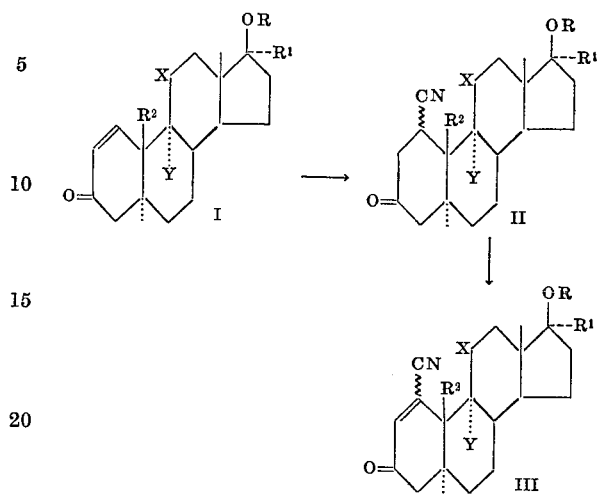

In the above formulae R, R¹, R², X and Y have the same meaning as set forth hereinbefore.

In practicing the process outlined above, the starting Δ¹-androsten-17β-ol-3-one derivative (I) is treated with potassium cyanide in a lower alkanol, such as ethanol, preferably at reflux temperature, for approximately 1 hour, and the resulting product is chromatographed, preferably on silica gel, thus affording the corresponding 1α-cyano and 1β-cyano-androstan-17β-ol-3-one (II), each of which, upon reaction with approximately 1 molar equivalent of 2,3-dichloro-5,6-dicyano-1,4-benzoquinone, preferably in dioxane at reflux temperature and for about 10 hours, yield the corresponding 1-cyano-Δ¹-androsten-17β-ol-3-one derivative (III).

The above 1-cyano-androstanes (II) may also be transformed into the corresponding 1-cyano-Δ¹-androstenes (III) by conventional bromination with approximately 1 molar equivalent of bromine followed by dehydrobromination with an alkali or alkaline earth metal carbonate in an amide, for example, calcium carbonate in dimethylformamide, preferably at reflux temperature, for approximately 45 minutes.

The compounds of the present invention having a secondary hydroxyl group, are conventionally acylated in pyridine with an acylating agent, such as an anhydride or a chloride of a hydrocarbon carboxylic acid of the type described hereinbefore, to give the corresponding acylates.

The compounds of the present invention having in the molecule a tertiary hydroxyl group, e.g. at C–17 are conventionally esterified in the presence of p-toluenesulfonic acid with an acylating agent, such as acetic anhydride, caproic anhydride, cyclopentylpropionic anhydride, or enanthic anhydride, to produce the corresponding esters.

The following specific examples serve to illustrate, but are not intended to limit the scope of the present invention:

PREPARATION 1

A solution of 1 g. of 17α-ethinyl testosterone in 20 cc. of dioxane-ether (1:1) was added in a steady stream to a solution of 0.1 g. of lithium in 100 cc. of anhydrous liquid ammonia with good stirring. At the end of the addition the blue color was discharged by the addition of 5 g. of ammonium chloride and the ammonia was allowed to evaporate. The product was extracted with ether, washed with water, dried and the ether evaporated to afford a gum which was adsorbed from 100 cc. of benzene onto 50 g. of alumina. Elution with benzene-ether afforded a product which upon recrystallization from acetone-hexane gave 17α-ethinyl-androstan-17β-ol-3-one.

PREPARATION 2

A mixture of 500 mg. of the latter compound 10 cc. of dioxane and 1.1 molar equivalents of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 17α-ethinyl-Δ¹-androsten-17β-ol-3-one.

The compounds listed hereinafter under A, were treated by the latter procedure, thus yielding respectively the products set forth under B.

| A | B |
|---|---|
| 17α-vinyl-19-nor-androstan-17β-ol-3-one. | 17α-vinyl-19-nor-Δ¹-androsten-17β-ol-3-one. |
| 17α-ethinyl-19-nor-androstan-17β-ol-3-one. | 17α-ethinyl-19-nor-Δ¹-androsten-17β-ol-3-one. |
| 9α-chloro-17α-methyl-19-nor-androstane-11β, 17β-diol-3-one. | 9α-chloro-17α-methyl-19-nor-Δ¹-androstene-11β, 17β-diol-3-one. |
| 9α-fluoro-17α-methyl-19-nor-androstane-11β, 17β-diol-3-one. | 9α-fluoro-17α-methyl-19-nor-Δ¹-androstene-11β, 17β-diol-3-one. |

Example I

A mixture of 1 g. of Δ¹-androsten-17β-ol-3-one, 1 g. of potassium cyanide and 50 cc. of ethanol was heated under reflux for 1 hour. Addition of water and extraction with with ethyl acetate, followed by drying of the extract and evaporation of the solvent afforded a product which was adsorbed from methylene chloride-hexane onto 100 g. of silica gel. Elution with mixtures of methylene chloride-acetone afforded two products which upon crystallization gave 1α-cyano-androstan-17β-ol-3-one (Compound No. 1) and 1β-cyano-androstan, 17β-ol-3-one (Compound No. 2).

The compounds listed hereinafter under A, were treated following the latter procedure, thus yielding the corresponding products set forth below under B:

| A | Compound No. | B |
|---|---|---|
| 17α-methyl-Δ¹-androsten 17β-ol-3-one. | 3 | 1α-cyano-17α-methyl-androstan-17β-ol-3-one. |
|  | 4 | 1β-cyano-17α-methyl-androstan-17β-ol-3-one. |
| 17α-ethinyl-Δ¹-androsten 17β-ol-3-one. | 5 | 1α-cyano-17α-ethinyl-androstan-17β-ol-3-one. |
|  | 6 | 1β-cyano-17α-ethinyl-androstan-17β-ol-3-one. |
| 19-nor-Δ¹-androsten-17β-ol-3-one. | 7 | 1α-cyano-19-nor-androstan-17β-ol-3-one. |
|  | 8 | 1β-cyano-19-nor-androstan-17β-ol-3-one. |
| 17α-ethyl-19-nor-Δ¹-androsten-17β-ol-3-one. | 9 | 1α-cyano-17α-ethyl-19-nor-androstan-17β-ol-3-one. |
|  | 10 | 1β-cyano-17α-ethyl-19-nor-androstan-17β-ol-3-one. |
| 17α-vinyl-19-nor-Δ¹-androsten-17β-ol-3-one. | 11 | 1α-cyano-17α-vinyl-19-nor-androstan-17β-ol-3-one. |
|  | 12 | 1β-cyano-17α-vinyl-19-nor-androstan-17β-ol-3-one. |
| 17α-ethinyl-19-nor-Δ¹-androsten-17β-ol-3-one. | 13 | 1α-cyano-17α-ethinyl-19-nor-androstan-17β-ol-3-one. |
|  | 14 | 1β-cyano-17α-ethinyl-19-nor-androstan-17β-ol-3-one. |
| Δ¹-androstene-11β, 17β-diol-3-one. | 15 | 1α-cyano-androstane-11β-17β-diol-3-one. |
|  | 16 | 1β-cyano-androstane-11β, 17β-diol-3-one. |
| 17α-methyl-Δ¹-androstene 17β,-diol-3-one. | 17 | 1α-cyano-17α-methyl-androstane-11β,17β-diol-3-one. |
|  | 18 | 1β-cyano-17α-methyl-androstane-11β,17β,diol-3-one. |
| 9α-fluoro-17α-methyl-Δ¹-androstene-11β,17β diol-3-one. | 19 | 1α-cyano-9α-fluoro-17α-methyl-androstane-11β,17β diol-3-one. |
| 9α-fluoro-17α-methyl-19-nor-Δ¹-androstene-11β, 17β-diol-3-one. | 20 | 1β-cyano-9α-fluoro-17α-methyl-androstane-11β,17β-diol-3-one. |
|  | 21 | 1α-cyano-9α-fluoro-17α-methyl-19-nor-androstane-11β,17β-diol-3-one. |
|  | 22 | 1β-cyano-9α-fluoro-17α-methyl-19-nor-androstane-11β,17β-diol-3-one. |
| 9α-chloro-17α-methyl-19-nor-Δ¹-androstene-11β, 17β-diol-3-one. | 23 | 1α-cyano-9α-chloro-17α-methyl-19-nor-androstane-11β,17β-diol-3-one. |
|  | 24 | 1β-cyano-9α-chloro-17α-methyl-19-nor-androstane-11β,17β-diol-3-one. |
| 9α-fluoro-17α-methyl-Δ¹-androsten-17β-ol-3,11-dione. | 25 | 1α-cyano-9α-fluoro-17α-methyl-androstan-17β-ol-3,11-dione. |
|  | 26 | 1β-cyano-9α-fluoro-17α-methyl-androstan-17β-ol-3,11-dione. |

Example II

A mixture of 500 mg. of Compound No. 1, 10 cc. of dioxane and 1.1 mol equivalents of 2,3-dichloro-5,6-dicyano 1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 1-cyano-Δ¹-androsten-17β-ol-3-one (Cpd. No. 27).

The compounds, Nos. 3, 6, 7, 9, 12, 13, 16, 17, 19, 22, 23 and 25, were treated by the latter procedure, thus furnishing respectively:

Compound Number
(28) 1-cyano-17α-methyl-Δ¹-androsten-17β-ol-3-one.
(29) 1-cyano-17α-ethinyl-Δ¹-androsten-17β-ol-3-one.
(30) 1-cyano-19-nor-Δ¹-androsten-17β-ol-3-one.
(31) 1-cyano-17α-ethyl-19-nor-Δ¹-androsten-17β-ol-3-one.
(32) 1-cyano-17α-vinyl-19-nor-Δ¹-androsten-17β-ol-3-one.
(33) 1-cyano-17α-ethinyl-19-nor-Δ¹-androsten-17β-ol-3-one.
(34) 1-cyano-Δ¹-androstene-11β,17β-diol-3-one.
(35) 1-cyano-17α-methyl-Δ¹-androstene-11β,17β-diol-3-one.
(36) 1-cyano-9α-fluoro-17α-methyl-Δ¹-androstene-11β,17β-diol-3-one.
(37) 1-cyano-9α-fluoro-17α-methyl-19-nor-Δ¹-androstene-11β,17β-diol-3-one.
(38) 1-cyano-9α-chloro-17α-methyl-18-nor-Δ¹-androstene-11β,17β-diol-3-one.
(39) 1-cyano-9α-fluoro-17α-methyl-Δ¹-androsten-17β-ol-3,11-dione.

Example III

A mixture of 1 g. of Compound No. 1, 4 cc. of pyridine and 2 cc. of acetic anhydride was kept at room temperature overnight, poured into ice water, the formed precipitate was filtered, washed with water and dried. Crystallization from acetone-hexane gave 1α-cyano-androstan-17β-ol-3-one acetate (Cpd. No. 40).

The compounds, Nos. 2, 7, 15 and 27, were treated by the above procedure, giving respectively:

Compound Number
(41) 1β-cyano-androstan-17β-ol-3-one acetate.
(42) 1α-cyano-19-nor-androstan-17β-ol-3-one acetate.
(43) 1α-cyano-androstane-11β,17β-diol-3-one 17-acetate.
(44) 1-cyano-Δ¹-androsten-17β-ol-3-one acetate.

Example IV

The starting compounds of Example III were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

Example V

To a solution of 5 g. of Compound No. 3 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 1α-cyano-17α-methyl-androstan-17β-ol-3-one caproate (Cpd. No. 45).

The compounds, Nos. 6, 19, 23, 26, 32, 36, and 37, were treated by the latter method, thus furnishing respectively:

Compound Number
(46) 1β-cyano-17α-ethinyl-androstan-17β-ol-3-one caproate.
(47) 1α-cyano-9α-fluoro-17α-methyl-androstane-11β,17β-diol-3-one 17-caproate.
(48) 1α-cyano-9α-chloro-17α-methyl-19-nor-androstane-11β,17β-diol-3-one 17-caproate.
(49) 1β-cyano-9α-fluoro-17α-methyl-androstan-17β-ol-3,11-dione caproate.
(50) 1-cyano-17α-vinyl-19-nor-Δ¹-androsten-17β-ol-3-one caproate.
(51) 1-cyano-9α-fluoro-17α-methyl-Δ¹-androstene-11β,17β-diol-3-one 17-caproate.
(52) 1-cyano-9α-fluoro-17α-methyl-19-nor-Δ¹-androstene-11β,17β-diol-3-one 17-caproate.

Example VI

The starting compounds of Example V were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

Example VII

A solution of 5 g. of Compound No. 1 in 100 cc. of acetic acid was treated with a few drops of hydrogen bromide in acetic acid and subsequently dropwise and with stirring, with a solution of 1.1 molar equivalents of bromine in 50 cc. of acetic acid. After all the bromine had been consumed, water was added, the formed precipitate filtered, washed with water to neutral and dried under vacuum. Recrystallization from acetone-hexane yielded 2α-bromo-1-cyano-androstan-17β-ol-3-one (Cpd. No. 53).

2 g. of Compound No. 53 in 40 cc. of cold dimethylformamide was added over 15 minutes to a suspension of 5 g. of finely divided calcium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded 1-cyano-Δ¹-androsten-17β-ol-3-one (Cpd. No. 27).

Upon treatment of Compounds Nos. 3, 6, 7, 9, 12, 13, 16, 17, 19, 22, 23 and 25 by the two latter procedures there were respectively obtained products identical with Compounds Nos. 28 to 39, inclusive.

I claim:
1. A compound of the following formula:

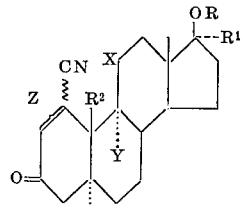

wherein R is selected from the group consisting of hydrogen and a hydrocarbon carboxylic acyl group of less than 12 carbon atoms; $R^1$ is a member of the group consisting of hydrogen, lower alkyl, lower alkenyl and lower alkinyl; $R^2$ is selected from the group consisting of hydrogen and methyl; X is a member of the group consisting of β-hydroxyl and a keto group; Y is selected from the group consisting of hydrogen, fluorine and chlorine; and Z is selected from the group consisting of a double bond and a saturated linkage, each between C–1 and C–2.

2. 1-cyano-androstane-11β,17β-diol-3-one.
3. 1-cyano-17α-methyl-androstane-11β,17β-diol-3-one.
4. 1-cyano-9α-fluoro-17α-methyl-androstane-11β,17β-diol-3-one.
5. 1-cyano-9α-fluoro-17α-methyl-19-nor-androstane-11β,17β-diol-3-one.
6. 1-cyano-9α-chloro-17α-methyl-19-nor-androstane-11β,17β-diol-3-one.
7. 1-cyano-9α-fluoro-17α-methyl-androstane-17β-ol-3,11-dione.

References Cited

UNITED STATES PATENTS 3,054,809   9/1962   Bowers et al. _ _ _ _ _ _ 260—397.3

OTHER REFERENCES

Bowers et al.: J.A.C.S. 79 pp. 4556–4557 (1957).

HENRY A. FRENCH, *Primary Examiner.*

U.S. Cl. X.R.

167—65, 74; 260—397.4.